United States Patent

Ward et al.

Patent Number: 5,150,463
Date of Patent: * Sep. 22, 1992

[54] MULTI PROCESSOR DATA PROCESSING SYSTEM WITH REMOTE PACKET COPYING MECHANISM

[75] Inventors: Michael Ward, Bolton; Ian Watson, Stockport; Pak S. Wong, Manchester, all of Great Britain

[73] Assignee: International Computers Limited, London, England

[*] Notice: The portion of the term of this patent subsequent to Jul. 9, 2008 has been disclaimed.

[21] Appl. No.: 396,954

[22] Filed: Aug. 22, 1989

[30] Foreign Application Priority Data

Sep. 13, 1988 [GB] United Kingdom ............... 8821410

[51] Int. Cl.⁵ .............................................. G06F 15/16
[52] U.S. Cl. .............................. 395/200; 364/DIG. 1; 364/242.94; 364/242.95; 364/228.3; 364/228.4; 364/229.0
[58] Field of Search ... 364/200 MS File, 900 MS File; 395/200

[56] References Cited

U.S. PATENT DOCUMENTS 4,777,595 10/1988 Strecker et al. .................... 364/200
5,006,978 4/1991 Neches et al. ...................... 364/200
5,021,942 6/1991 Watson et al. ..................... 364/200
5,031,090 7/1991 Banach et al. ..................... 364/200

OTHER PUBLICATIONS

Watson et al., "Flagship computational models and machine architecture", ICL Technical Journal, May, 1987.

*Primary Examiner*—Gareth D. Shaw
*Assistant Examiner*—Abdollah Katbab
*Attorney, Agent, or Firm*—Lee, Mann, Smith, McWilliams, Sweeney & Ohlson

[57] ABSTRACT

A data processing system comprises a number of processing nodes, each having a processor and a local store. The workload of the system is represented by packets, including function packets specifying a function and pointers to one or more argument packets to which the function is to be applied. When a node processes a function packet, it checks whether all its argument packets are resident in the local store. If not, copies of the argument packets are fetched from the remote nodes in which they reside. These argument packets are referenced by special indirection packets, which contain the local and global address of the argument packet, and a reference count for garbage collection purposes.

1 Claim, 12 Drawing Sheets

Fig.4.
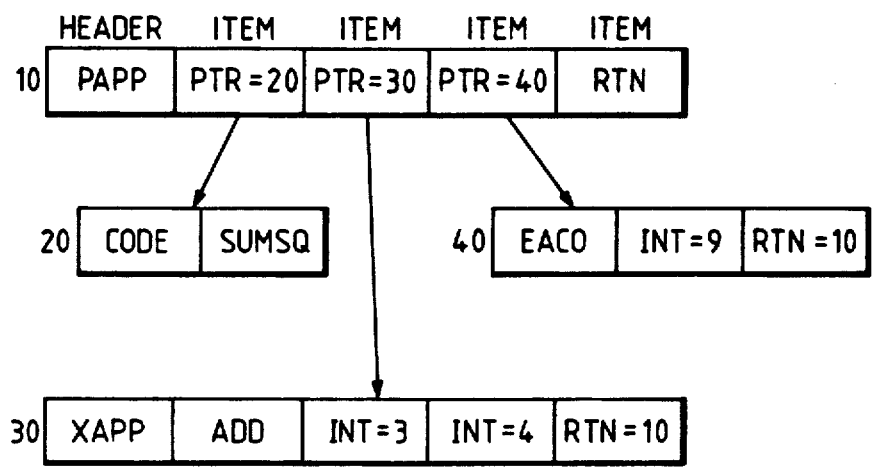
Fig.5.
Fig.6.
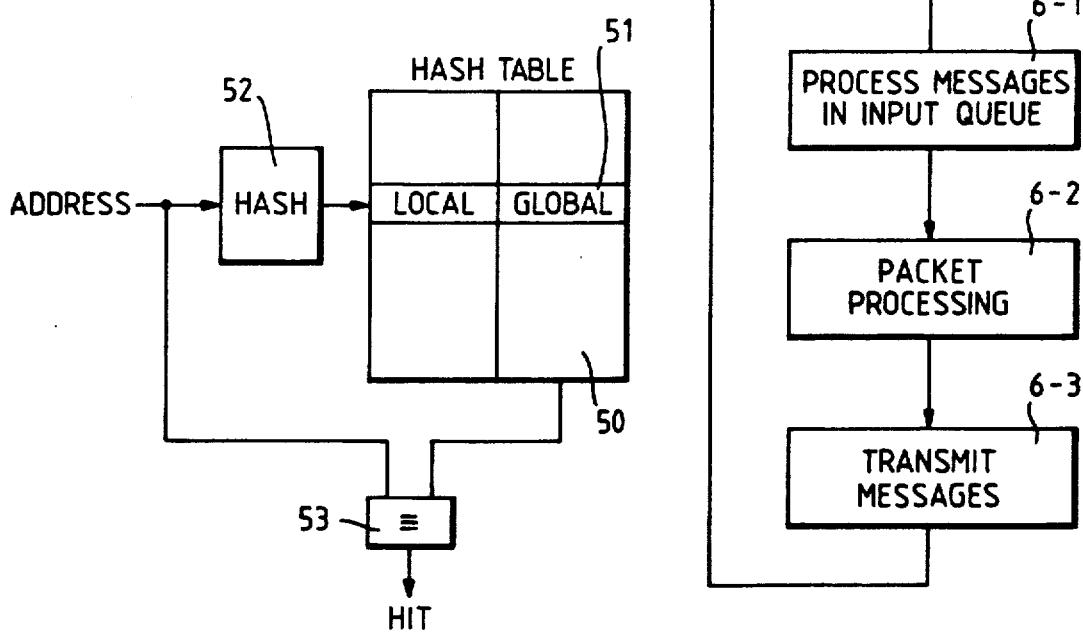

MULTI PROCESSOR DATA PROCESSING SYSTEM WITH REMOTE PACKET COPYING MECHANISM

BACKGROUND OF THE INVENTION

This invention relates to data processing systems.

More specifically, the invention is concerned with a multi-processor data processing system of the kind in which the workload of the system is divided into packets, each packet specifying a function and one or more arguments to which the function is to be applied. One system of this kind is described, for example, in "Flagship Computational Models and Machine Architecture", I. Watson et al, and "Flagship Hardware and Implementation", P. Townsend, both in the ICL Technical Journal Vol 5, Issue 3, May 1987, published by the Oxford University Press, England.

In such a system, it is desirable that, when a function packet is processed, all its arguments should be available in the local store of the processing node in which the function packet resides. If some of the argument packets are resident in other nodes, then it is necessary to create local copies of those packets in the local store.

The above articles mention the need for a local copying mechanism, and suggest the use of a hashing mechanism for accessing the local copies. However, it has been found that a simple hashing mechanism is unsatisfactory. In particular, it can cause problems where two or more arguments of a particular function packet have the same hash address, which means that it is not possible for both arguments to be accessed simultaneously by the hashing mechanism, and a deadlock results. Moreover, the use of a simple hashing mechanism creates problems in sharing argument packets, and also with garbage collection of copies that are no longer required.

The object of the present invention is to provide an improved mechanism for handling local copies of argument packets which alleviates these problems.

SUMMARY OF THE INVENTION

According to the invention there is provided a data processing system comprising a plurality of processing nodes, each of which includes a data processor and a local store for holding a plurality of packets for processing, at least some of said packets being function packets specifying a function and containing a pointer to at least one argument packet to which the function is to be applied, > wherein each processing node includes means for processing a function packet to determine whether the argument packet is resident in the local store and, if not, for fetching a copy of the argument packet into the local store from the remote node in which it is resident, creating an indirection packet containing the address of the argument packet in the remote node and also the address of the local copy of that packet, and setting a pointer in the function packet to point to the indirection packet.

BRIEF DESCRIPTION OF THE DRAWINGS.

FIG. 4 shows the formats of packets.

FIG. 5 shows a hash table used in each node.

FIG. 6 shows the overall operation of each node.

DESCRIPTION OF AN EMBODIMENT OF THE INVENTION

Figure 1:
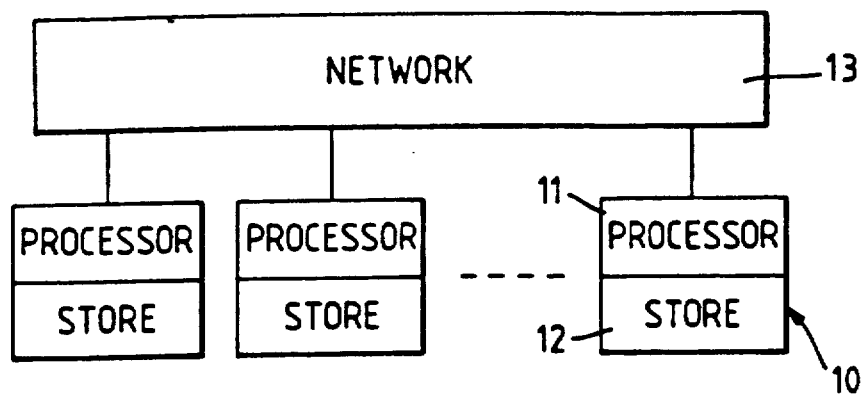
FIG. 1 is an overall view of a data processing system, comprising a number of processing nodes.

Referring to FIG. 1, the data processing system comprises a plurality of processing nodes 10.

Each node comprises a processor 11 and a local store 12.

The workload of the system is divided into units referred to as packets, which will be described in detail below. A packet can reside in any of the local stores 12. Conceptually, all the local stores form a single packet memory for the system, and each packet has a 32-bit address indicating its location within this packet memory. Bits 31-24 of this address indicate which of the individual local stores the packet is resident in while the bits 23-0 indicate the address of the packet within that store.

Each processor 11 accesses active packets held in its own local store 12 and processes them according to the type of packet, as will be described. The processing nodes operate simultaneously, in parallel, resulting in a high overall rate of processing, proportional to the number of processing nodes in the system.

The processing nodes are interconnected by an inter-processor network 13, which allows any processor to send a message to any other one of the processors. The network 13 may, for example, be a delta network.

If required, a processing node can read a packet from its own local store and export it over the network 13 to another node, so that it will now reside in the local store of that other node. For example, when a processing node detects that it is becoming overloaded, it may export packets to other nodes so as to even out the workload between the nodes. The processing nodes can also send messages to each other over the network, as will be described.

Figure 2:
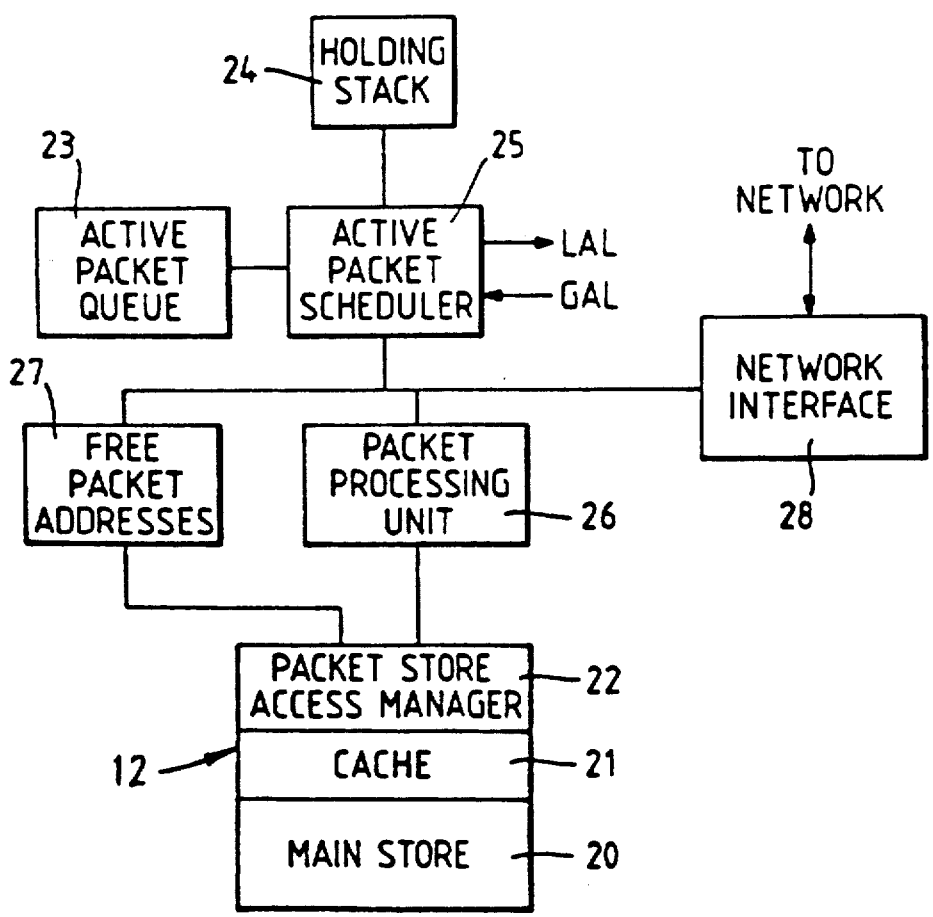
FIG. 2 is a block diagram showing one of the nodes, including an active packet scheduler and a packet processing unit.

Referring now to FIG. 2, this shows one of the processing nodes in greater detail.

The local store 12 within the node comprises a main store 20, a cache store 21, and a store access manager 22. The main store is a random access memory which holds all the packets resident in this node. The cache store is a smaller, faster, associatively addressed memory, which holds copies of data from the main store currently in use. The store access manager controls access to the cache and main store, and controls the copying of data from the main store into the cache.

The node also includes an active packet queue (APQ) 23. This is a first-in-first-out memory, and is used to hold the addresses of active packets in the local store 12, i.e. packets which are waiting to be executed in this node. Overflow from the APQ is held in a holding stack (HS) 24, which is organised as a last-in-first-out memory. The APQ and HS are controlled by an active packet scheduler (APS) 25 as will be described.

The APS passes packet addresses to a packet processing unit (PPU) 26, which accesses the packets from the local store 12 and processes them. This processing generally involves re-writing the packet and changing its type and state. The processing may also involve re-writing or changing the state of other packets, the creation of new packets, or the deletion of existing packets.

The processing node also includes a free packet address store (FPA) 27, which holds addresses of free packet locations in the local store 12. Whenever the PPU deletes a packet, it returns the address of the packet to the FPA. Conversely, when a new packet is created, a free packet address is removed from the FPA and the new packet is placed in this location.

The APS and PPU interface with the inter-processor network by way of a network interface (NIF) 28. This contains an input message queue for holding messages received from other processing nodes, and an output message queue for holding messages waiting to be transmitted to other processing nodes.

In operation the APS in each node generates a local activity level signal (LAL) indicating the current workload of this node, i.e. the number of active packets waiting to be executed. This signal is applied to the network 13 by way of the NIF. The network receives these signals from all the nodes, and generates a global activity level signal (GAL), which is returned to all the nodes.

Packet scheduling

Figure 3:
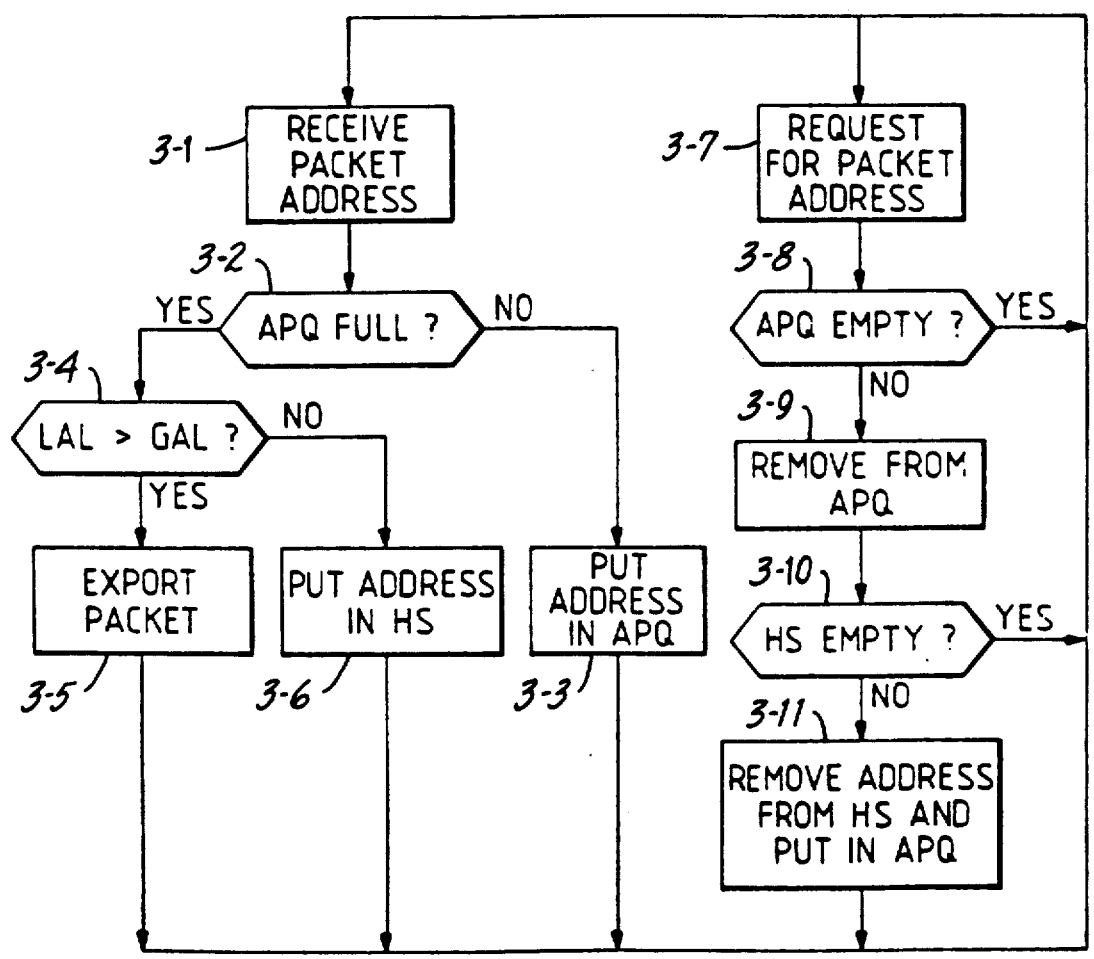
FIG. 3 is a flow chart showing the operation of the active packet scheduler.

Referring now to FIG. 3, this shows the operational algorithm of the active packet scheduler APS. This algorithm may be implemented either in hardware, microcode, software, or a mixture of these. The exact nature of the implementation forms no part of the present invention and so will not be described in detail.

Whenever the APS receives (3-1) a packet address, either from the associated PPU in the same node, or from another node via the NIF, it first checks (3-2) whether the active packet queue APQ is full. If not, then the packet address is placed (3-3) in the APQ. If, on the other hand, the APQ is full, the APS checks (3-4) whether the local activity level LAL of this node is greater than the global activity level GAL. If so, the packet is read out of the local memory and exported (3-5) over the network to one of the other nodes that has a lower activity level.

If the local activity level LAL is less than the global level GAL, then the packet is not exported. Instead, its address is placed (3-6) in the holding stack HS.

Whenever the APS receives (3-7) a request for a packet from the associated PPU in the same node, it first checks (3-8) whether the APQ is empty. If it is not empty, it removes (3-9) a packet address from the APQ and returns it to the PPU. The APS then checks (3-10) whether the HS is empty. If it is not empty, the APS removes (3-11) the last address held in the HS and puts it into the APQ.

The packet format will now be described. Each packet consists of a header, followed by one or more packet items.

Packet header format

The header includes the following fields: TYPE, PSTATE, ITEMCNT, SUSCNT, LOCCNT, STR and REFCNT.

The TYPE field indicates the packet type.
Possible packet types include the following:
XAPP executable apply
PAPP processable apply
UNCO unevaluated constructor
EACO, ENCO, evaluated constructors
SCON stateholder
CIND copy indirection
LIND lazy indirection
IIND instance indirection.
CODE code The PSTATE field indicates the state of the packet, as follows:
ACT active
DOR dormant
SUS suspended
REL relay The ITEMCNT field indicates the number of items in the packet.

The SUSCNT field indicates the number of arguments that must be evaluated before a suspended packet can be activated.

The LOCCNT field indicates the number of arguments of the packet that must be local (i.e. in the local store of the processing node) before the packet can be executed.

The STR field indicates the number of strict arguments in the packet. A strict argument of a function is one which must be in evaluated form before the function can be executed.

The REFCNT field is a reference count which is used, as will be explained later, for garbage collection: any packet that has REFCNT equal to zero can be deleted and its address returned to the FPA.

The header also includes control bits MKLOC, NRO and EXPINH.

MKLOC indicates that one or more arguments (as specified by the LOCCNT field) must be made local before the packet can be executed.

NRO indicates that at least one of the items in this packet is a pointer to a stateholder packet.

EXPINH indicates that this packet is not to be exported to another processing node.

Packet item format

The first byte in each packet item holds a two-bit type code ITYPE, and a six-bit qualifier QUAL. ITYPE indicates the item type as follows:

| ITYPE | item type |
|---|---|
| 0 | null |
| 1 | value |
| 2 | return address |
| 3 | pointer. |

In the case of a value item (ITYPE=1), QUAL indicates the type of value represented by the item. For example, a value item may represent an integer, a real number, a character, a boolean value or a built-in function code. A built-in function code represents one of a set of functions that can be executed by a processing node, such as ADD, SUBTRACT, MULTIPLY, DIVIDE and so on.

A return address item (ITYPE=2) contains a return address RTN which is used, as will be described, as a pointer from the packet to a parent packet in a graph structure. It also contains an item number which indicates the particular item within the parent packet in which a result value is to be placed.

A pointer item (ITYPE=3) contains a pointer PTR which points to an offspring packet in the graph structure. It also contains a weight value GW which is used, as will be described, in a garbage collection scheme.

The QUAL field of this item includes an evaluated flag EVAL, indicating whether the offspring packet has been evaluated, and a pointer qualifier PQUAL which indicates the type of the offspring packet.

In the case of a CODE packet, the packet items do not have a normal item format described above. Instead, the items contain a sequence of microcode instructions, for executing a user-defined function.

Packet formats

Referring to FIG. 4, this illustrates some possible packet layouts, and the way in which the packets can be organised in a graph structure by means of the pointer and return addresses.

A executable apply packet XAPP comprises a header, followed by an item representing a function to be performed, followed by one or more items representing the arguments of that function (with the strict arguments first, followed by the non-strict arguments, if any), and finally a notification list, comprising one or more return address items. The item representing the function may either be a built-in function, or a pointer to a code packet representing a user-defined function.

For example, in FIG. 4, the packet at address 30 is an XAPP packet having four items. The first item is a built-in function ADD. The next two items are literal integer values 3 and 4. The final item is a return address 10 indicating that the result of evaluating this packet is to be returned to the packet at address 10. It should be noted that both the arguments for the XAPP packet are in evaluated form, so that the packet can be evaluated as soon as it is activated.

A processable apply packet PAPP has a similar layout to an XAPP packet, the difference being in the way in which the packet is processed, as will be described. A PAPP packet is used where one or more of the arguments of the packet have not yet been evaluated.

For example, in FIG. 4, the packet address 10 is a PAPP packet having four items. The first item is a pointer which points to a CODE packet at address 20, containing microcode for executing a user-defined function. For example, the microcode may be a function SUMSQ which forms the sum of the squares of two arguments. The second and third items in the PAPP packet represent the arguments for this function. The first of these is a pointer to the XAPP packet at address 30. At this stage, this argument is unevaluated; it will be overwritten with the evaluated value (7) when the XAPP is processed. The second argument item is a pointer to an EACO packet at address 40, representing an integer data value 9 in this case. The final item of the PAPP packet is a return address which points back to a parent packet—is assumed that the graph shown in FIG. 4 represents only part of some larger graph.

Constructor packets EACO, ENCO and UNCO represent data values, or data structures such as lists or arrays. In the example shown in FIG. 4, the EACO packet at address 40 represents the simplest possible data structure i.e. a single data item (the integer value 9). More complex data structures can be built up by means of pointers within the constructor packets.

A stateholder packet SCON represents a variable value which can change during the course of computation. For example, a stateholder packet may represent a real-time clock value, or a semaphore value. The format of the stateholder packet is similar to that of a constructor packet.

An indirection packet CIND, LIND or IIND contains three packet items. The first (item 0) represents a local pointer (i.e. the address of a local copy of an argument packet). The second (item 1) is a global pointer (i.e. the address of the master version of the argument packet). The third (item 2) is a global weight value for the argument packet. The way in which these indirection packets are used will be described later.

Hash table

As mentioned above, a packet can reside in any of the nodes in the system. The address of the master version of a packet is referred to as its global address, and this address can be used by any one of the nodes to access the packet.

In addition, local copies of a packet may be created, as will be described, for use in a particular node. In order to allow sharing of these local copies, each node includes a hash table, as shown in FIG. 5.

Referring to FIG. 5, the hash table 50 holds a number of entries 51, each of which contains the global address of a packet, and the local address of a copy of that packet (if any).

When it is required to reference a packet, the global address of that packet is hashed, by means of a hash function circuit 52, and the result is used to address the hash table 50. The global address in the addressed entry of the hash table is then compared with the input global address, by means of a comparator circuit 53. If they are equal, a HIT signal is produced, indicating that the corresponding local address is available and can be read out of the addressed entry in the hash table.

The way in which the hash table is used will be described later.

Garbage collection

As mentioned above, each packet has a reference count REFCNT and each pointer item has a weight GW, which are used for garbage collection.

The basic garbage collection scheme is as follows.

Whenever a packet is created, its reference count is initially set to some power of two, and the weight of any pointer to that packet is set to the same value (assuming that there is only one pointer initially). The weight value can be logarithmically encoded, since it is always some power of two. Whenever a new pointer to the packet is created by copying an existing pointer, the new pointer and the existing pointer are both given weights equal to one half of the weight value of the existing pointer, but the reference count of the packet is unaltered.

Whenever a pointer is destroyed, the reference count of the packet to which it points is reduced by the weight of that pointer.

Thus it can be seen that, when the reference count of a packet reaches zero, this indicates that there are no remaining pointers to the packet. The packet can therefore be re-cycled in a garbage collection operation, by putting its address into the free packet address queue FPA.

This garbage collection scheme is described in more detail in U.S. Pat. No. 4,755,939.

In this embodiment, this scheme is used only for remote pointers (i.e. those that point to a packet resident in a remote node).

For local pointers (i.e. those that point to a local packet) the following simpler scheme is used. Whenever a local pointer is created, the reference count of the packet to which it points is incremented by one. Whenever a local pointer is destroyed, the reference count of the packet is decremented by one.

Thus, the reference count of a packet is the sum of weights of all remote pointers to it, plus the number of local pointers to that packet. As before, when the reference count reaches zero, the packet becomes a candidate for garbage collection.

The weighted reference count scheme for remote pointers has the advantage that it allows remote references to a packet to be copied without the need for messages to increment the reference count and removes the requirement for the synchronisation of increment and decrement messages. The simpler unweighted scheme is more efficient for local references.

Operation of processing node

Referring to FIG. 6, this shows the main operational loop performed by each of the processing nodes.

(6-1) The node processes any messages held in the input message queue of the network interface 28. The processing of messages will be described below in detail.

(6-2) The node then performs a packet processing operation. As will be described, this involves accessing the next active packet and performing operations on it according to the type and state of the packet. This may involve creating one or more messages which are placed in the output message queue of the network interface.

(6-3) The node then transmits any messages held in the output message queue.

Packet processing

Figure 7:
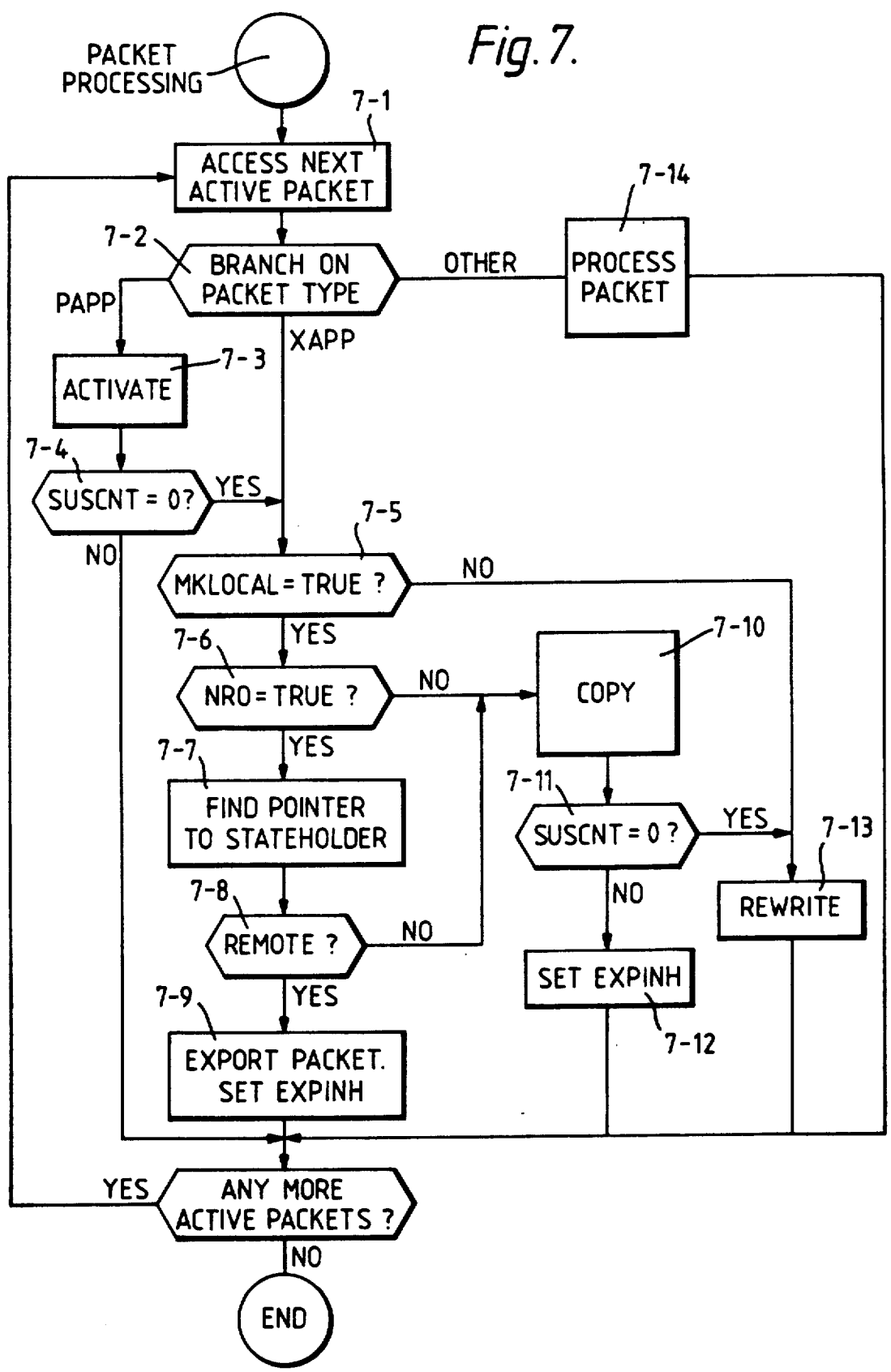
FIG. 7 shows the packet processing operation in each node.

Referring now to FIG. 7, this shows the packet processing operation in more detail.

(7-1) The PPU requests the active packet scheduler APS to send it a packet address from the APQ. The PPU then uses the packet address to access the packet from the local store. If the APQ is empty, the packet rewrite operation terminates.

(7-2) The PPU examines the packet type field in the header of the packet, and branches according to whether the packet is a PAPP, XAPP or some other type of packet.

(7-3) If the packet type is PAPP, then an ACTIVATE function is performed, in order to activate all the strict arguments of the packet. The ACTIVATE function examines all the packet items up to that indicated by the STR field of the packet header. If the item is an unevaluated pointer (ITYPE=3, EVAL = FALSE), the packet to which it points is activated. The SUSCNT field of the PAPP packet is set equal to the number of packets that are activated, and the packet is converted to an XAPP packet, with MKLOC set true.

If a packet to be activated is resident in the local packet store of the node, then it can be activated directly. If, on the other hand, the packet resides in a remote node, the ACTIVATE function creates a REMOTE FIRE message, and places it in the output message queue. This will then be transmitted to the remote node in which the packet resides, and will cause it to be activated in that node.

(7-4) The SUSCNT field of the packet is examined and, if it is non-zero, then the packet processing operation is ended, since the packet is now waiting for results to be returned from other packets. If the SUSCNT of the PAPP packet is zero, or if the packet is an XAPP packet, the following actions are performed.

(7-5) The MKLOC bit of the packet is examined.

(7-6) If MKLOC is true, then the NRO bit is examined.

(7-7) If NRO is true, this means that at least one of the arguments of the packet is a stateholder (SCON) packet. (No more than one strict argument may be a stateholder, but if there are any non-strict arguments, these may be stateholders also). The packet items are therefore examined, so as to find the first pointer item whose PQUAL field indicates that it is pointing to a SCON packet.

(7-8) The pointer address is then examined to determine whether the SCON patent is resident in the local packet store of this node, or in a remote node.

(7-9) If the SCON packet is not in the local packet store, then the packet being processed is exported to the remote node in which the SCON packet resides. This avoids the need for copying the SCON packet into the local store, and hence ensures that the SCON packet is unique. When the packet is exported, its EXPINH flag is set, so as to ensure that it will not be exported again from the node in which the SCON packet resides, until it has used the SCON packet.

(7-10) If the SCON packet is resident locally, or if NRO was not true, then a COPY function is performed. As will be described in detail later, the COPY function sends messages to remote nodes, requesting them to supply copies of argument packets which are required by the packet currently being processed. For each such message the SUSCNT field of the packet is incremented by one, so as to keep a record of the number of copies that the packet is awaiting (7-11) The SUSCNT field of the packet is now examined.

(7-12) If SUSCNT is non-zero, the EXPINH flag of the packet is set. This is to prevent the packet from being exported before the awaited argument packets are returned. The packet processing operation then terminates. The MKLOC bit is set false to bypass the making local phase when all arguments have been returned.

(7-13) If SUSCNT is zero, or if MKLOC is false, then the packet being processed must have all its argument packets, or copies of them, present in the local packet store. The packet can therefore be re-written in the manner specified by the first packet item (i.e. a built-in function, or a pointer to a CODE packet). The nature of the packet re-writing operation forms no part of the present invention and so will not be described in detail herein.

(7-14) If the packet being processed is neither a PAPP or an XAPP packet, then other processing operations are performed according to the packet type. For example, processing of an EACO packet involves returning a value to its parent packet, which causes the SUSCNT of the parent to be decremented.

COPY function

Figure 8:
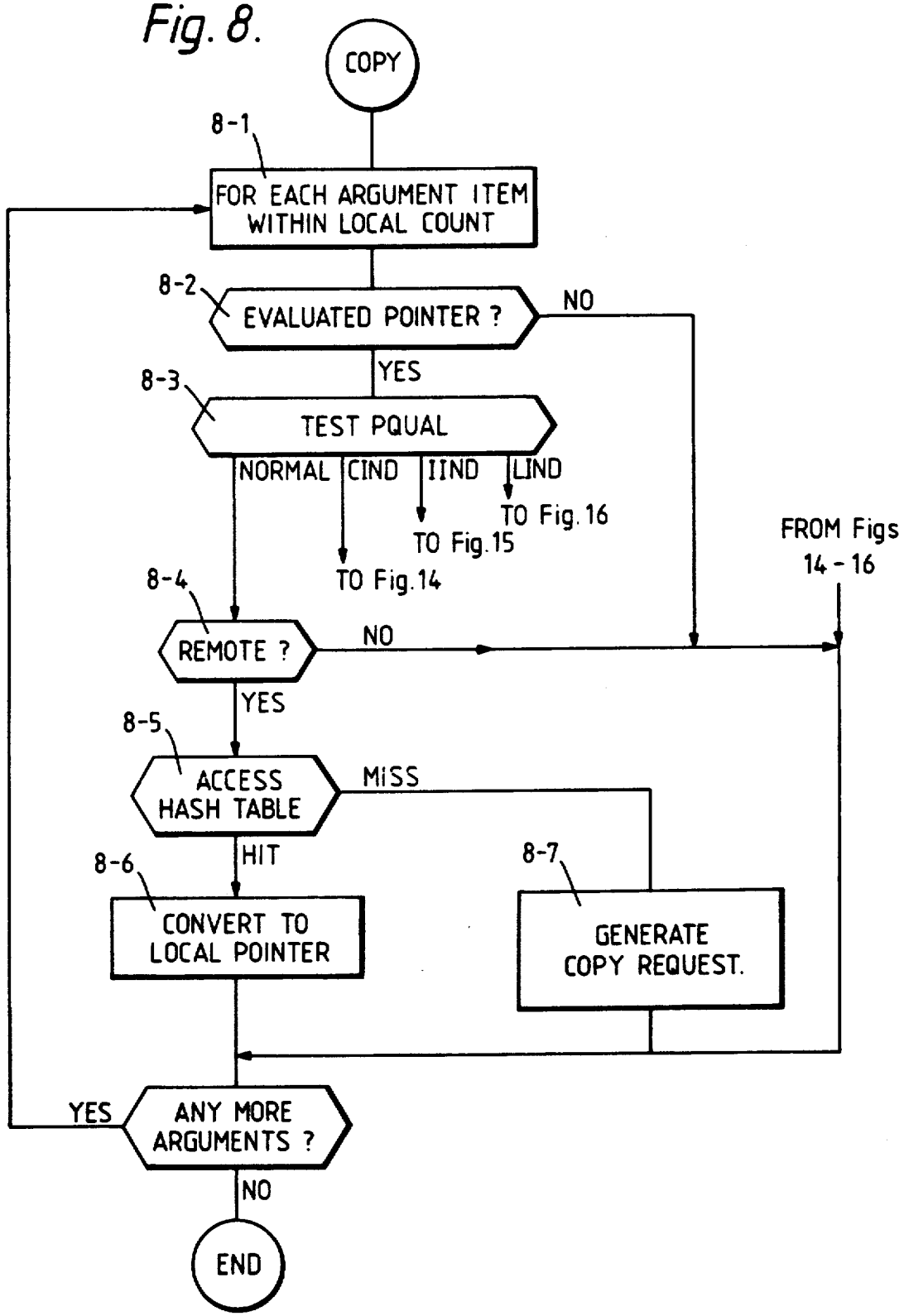
FIG. 8 shows a COPY routine for making local copies of argument packets where required.

Referring now to FIG. 8, this shows the COPY function in detail. As mentioned above, the purpose of this function is to obtain local copies of all arguments of the packet being processed.

(8-1) The steps described below are repeated for each item in the packet being processed, up to the item indicated by the LOCCNT field of the packet header. In other words, the steps are repeated for each argument that must be made local.

(8-2) The ITYPE field and EVAL flag of the item are tested. If ITYPE=3 and EVAL=TRUE, then this item is a pointer to an evaluated argument packet, which must therefore be made local.

(8-3) If the item is a pointer to an evaluated argument packet, then the PQUAL field of the item is tested, to determine the type of packet that is pointed to. A branch is made according to whether the packet pointed to is a CIND, IIND, LIND or normal (i.e. any other constructor type) packet.

(8-4) If the packet pointed to is a normal packet, the pointer address is examined to determine whether the packet is resident in the local store, or in some remote node. If it is local, then no further action is required.

(8-5) If, however, the packet is remote, an access is made to the hash table (FIG. 5) to determine whether any previous local copies of that packet have been made.

(8-6) If a hash table HIT is scored this means that a local copy of the required packet already exists. In this case, the local address in the hash table entry points to a copy indirection (CIND) packet which, in turn, contains a local pointer to the required packet. This pointer is therefore copied into the packet item currently being processed, replacing the global pointer. The weight of the old global pointer is added to the weight field GW of the CIND packet, and the reference count of the CIND packet is incremented by one to indicate that a new local reference to it has been created.

(8-7) If a hash table HIT is not scored, a COPY REQUEST message is generated and placed in the output message queue of the network interface. This message contains a copy of the packet item currently being processed, (i.e. the pointer and its weight value) and a return address RA pointing to this packet item. This message will, in due course, be transmitted to the remote node that holds the required argument packet. The SUSCNT field of the packet being processed is incremented by one.

COPY REQUEST

Figure 9:
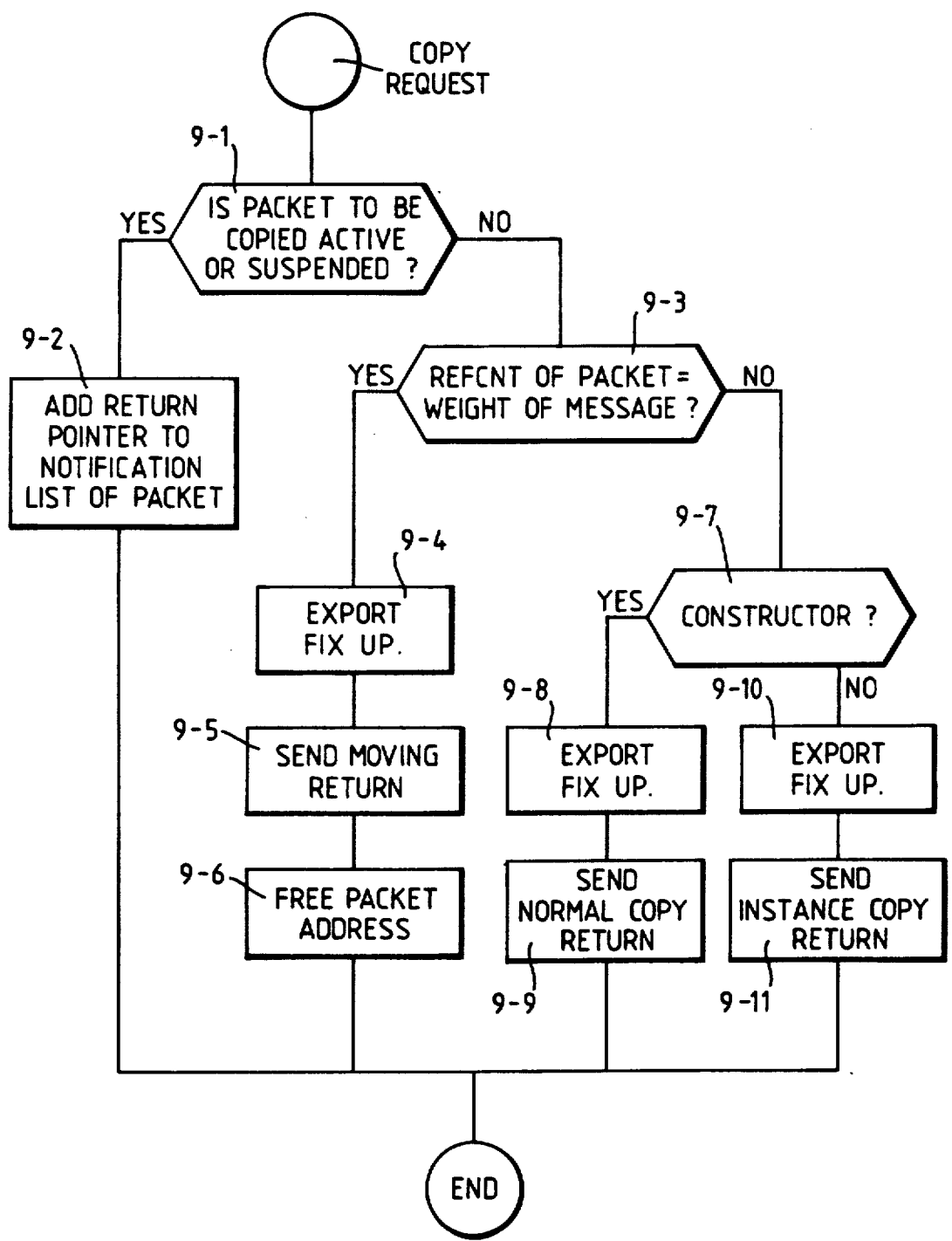
FIG. 9 shows the way in which a COPY REQUEST message is processed.

Referring to FIG. 9, this shows the way in which a node processes a COPY REQUEST message from another node.

(9-1) The packet to be copied is accessed and its PSTATE field is examined.

(9-2) If the packet to be copied is active or suspended, this means that it is currently being evaluated, and hence should not be copied until the evaluation has been completed. A suspended copy request is created in the remote processing element, and its address is placed on the notification list of the packet to be copied. This suspended copy request is activated when the packet to be copied has been evaluated. If the packet to be copied is neither active nor suspended, then the copy request proceeds as follows.

(9-3) The reference count REFCNT of the packet to be copied is compared with the weight GW of the pointer in the COPY REQUEST message. If they are equal, this means that the packet to be copied is not referenced by any other packets. It is therefore possible to export the master version of the packet back to the requesting node, rather than simply copying it. This is done as follows.

Figure 13:
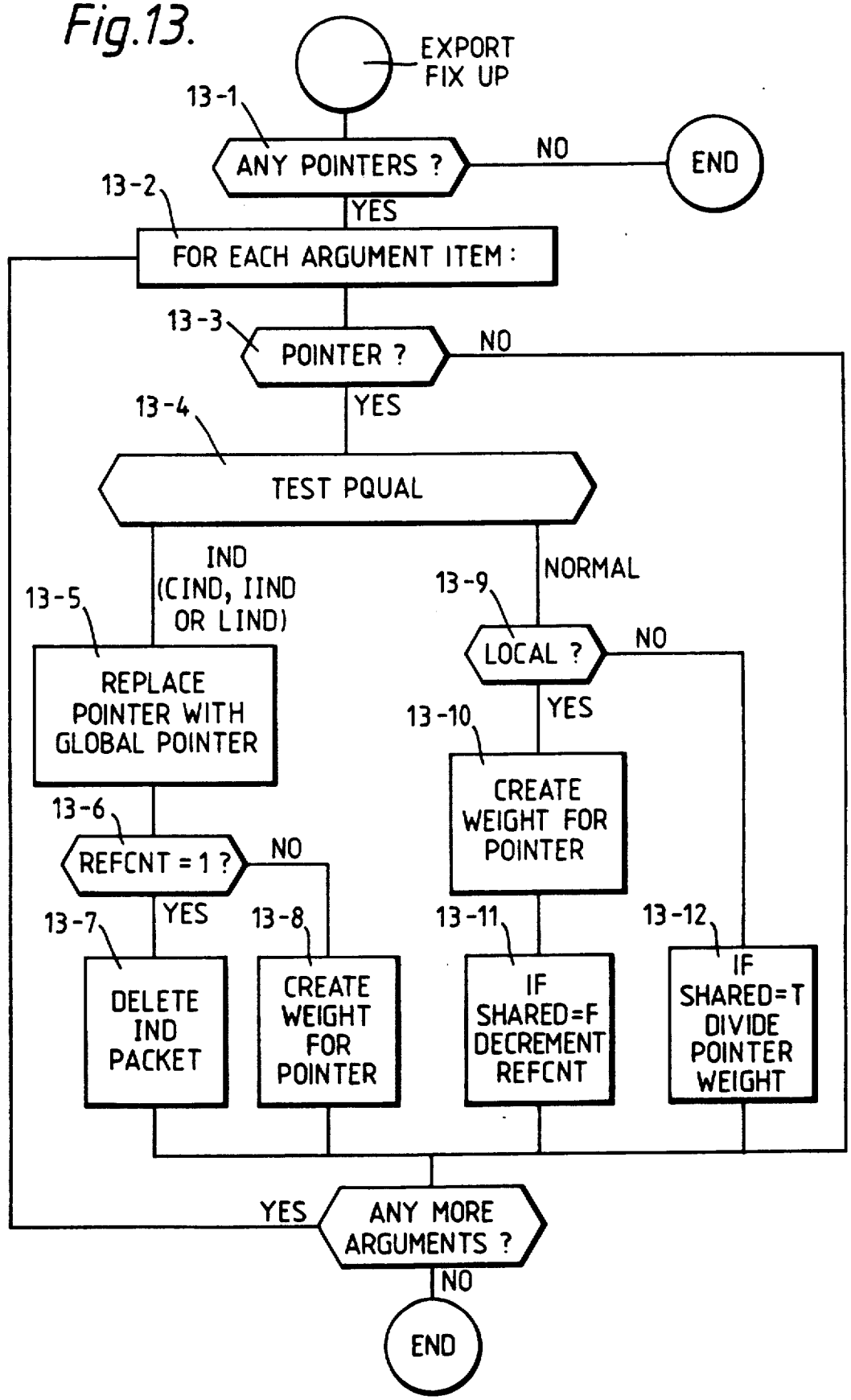
FIG. 13 shows an EXPORT FIX UP routine.

(9-4) First, an EXPORT FIX UP routine is called, to prepare the packet for exporting (see FIG. 13). This routine has a parameter SHARED, which in this case is set false.

(9-5) A MOVING RETURN message is generated, and placed in the output message queue, for transmission to the requesting node.

(9-6) The address of the packet is then returned to the free packet address store FPA, so as to release this packet location.

(9-7) If the reference count is not equal to the pointer weight, this means that the master version of the packet can not be exported. Instead, a copy is returned. First, a test is made to determine whether the packet to be copied is a constructor (i.e. EANCO, EACO, or UNCO).

(9-8) If it is a constructor, the EXPORT FIX UP routine is called. In this case, the parameter SHARED is true.

(9-9) A NORMAL COPY RETURN message is then generated and returned to the requesting node.

(9-10) If the packet to be copied is not a constructor or stateholder, the EXPORT FIX UP routine is called, again with SHARED=true.

(9-11) In this case, an INSTANCE COPY RETURN message is generated.

Each of the message types MOVING RETURN, NORMAL COPY RETURN and INSTANCE COPY RETURN includes a copy of the packet to be exported, and also a copy of the return address RA from the COPY REQUEST message.

MOVING RETURN

Figure 10:
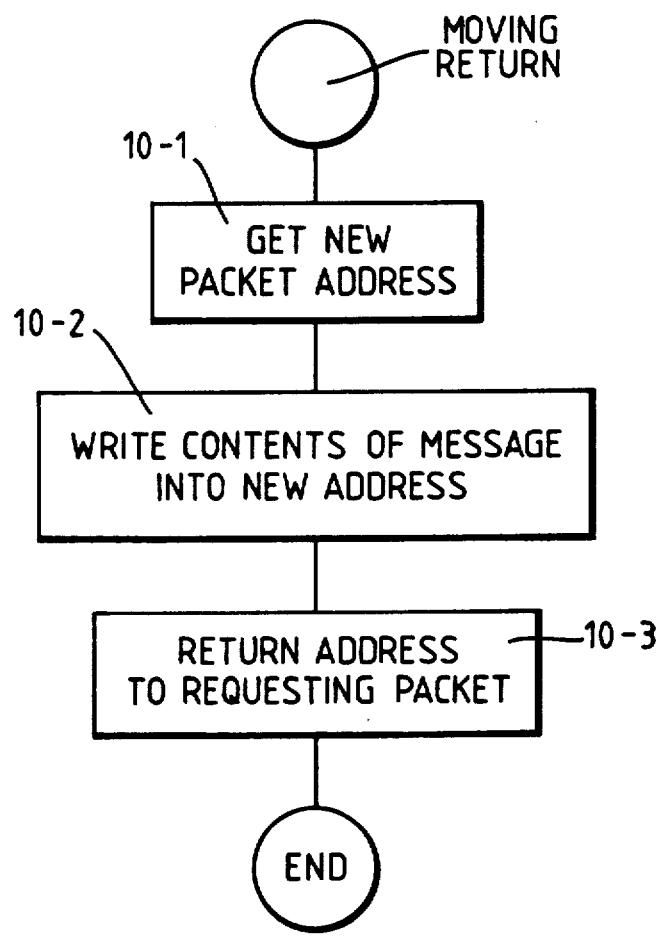
FIGS. 10 and 11 show the processing of RETURN messages.

Referring now to FIG. 10, this shows the action in a node when it processes a MOVING RETURN message.

(10-1) A new packet address is obtained from the FPA.

(10-2) The packet contained in the message is written into this new packet location, and its reference count field is set to one, to indicate that it is referred to by one local packet (i.e. the packet that requested it).

(10-3) The address of the new packet location is then written into the packet item referenced by the return address RA of the MOVING RETURN message. In other words, the pointer in the requesting packet is replaced by the new address of the re-located packet. The SUSCNT field of the requesting packet is decremented by one.

NORMAL COPY RETURN

Figure 11:
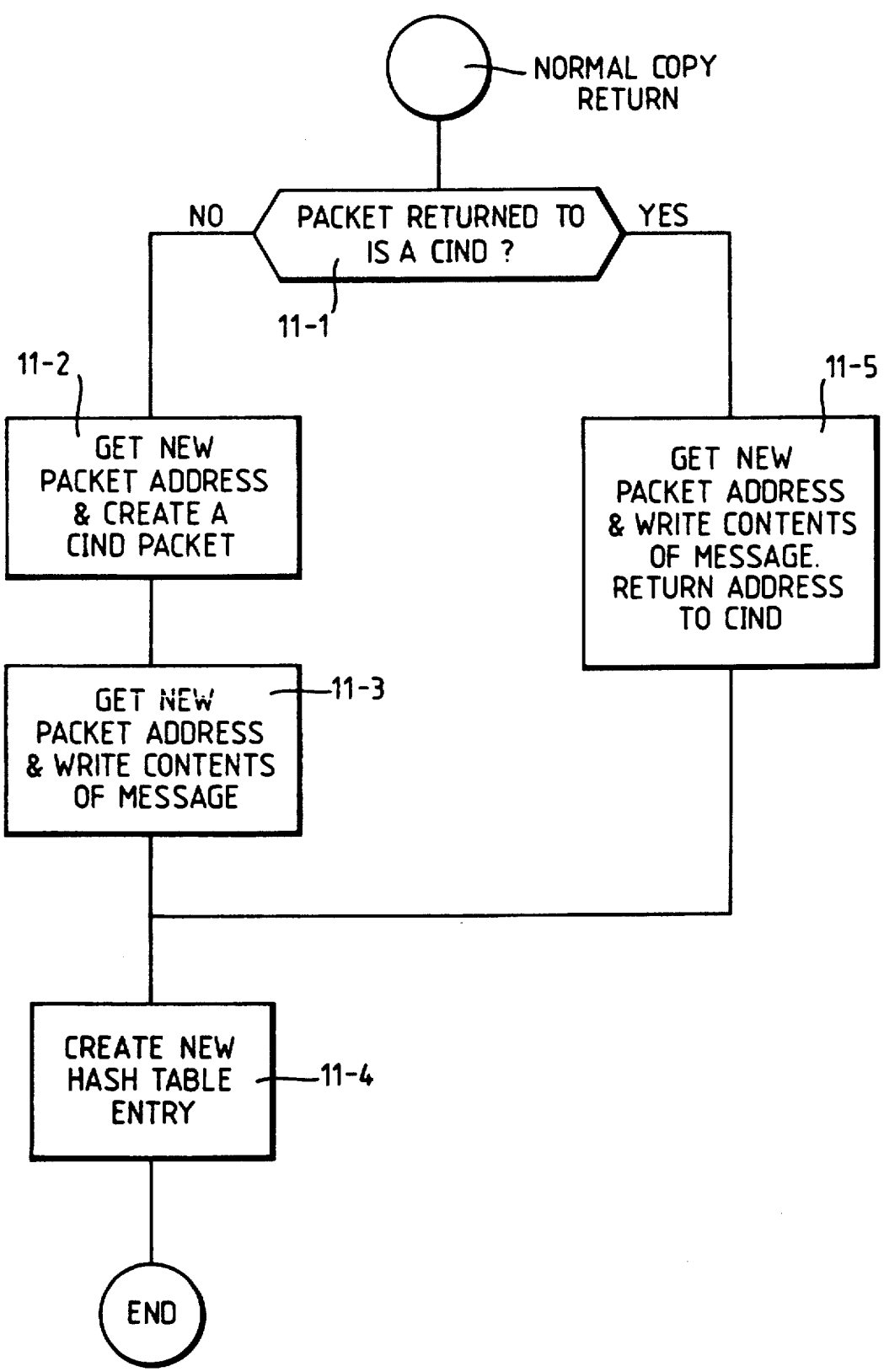
Figure 12:
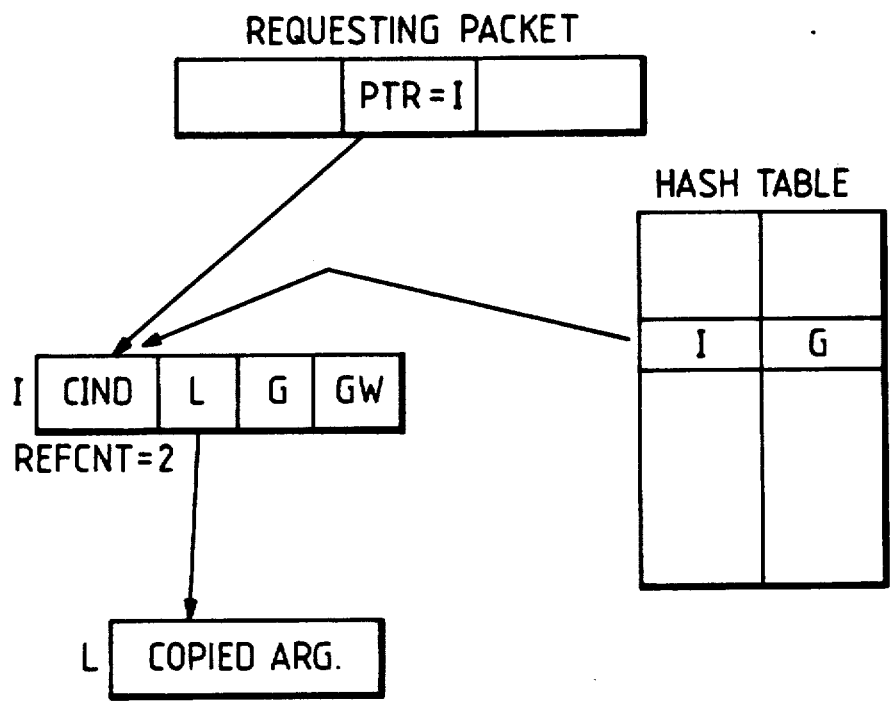
FIG. 12 illustrates the use of indirection packets.

Referring now to FIG. 11, this shows the action when a NORMAL COPY RETURN message is processed. FIG. 12 shows the packet structure produced as a result of processing the message.

(11-1) First, the requesting packet (i.e. the packet pointed to by the return address in the message) is examined, to determine if it is a CIND packet.

(11-2) If it is not a CIND, then a new packet location (I) is obtained from the free packet address store FPA and a new CIND packet is created in this location. The reference count REFCNT of this new packet is set to 2. The global pointer G to the requested packet is then copied from the requesting packet into item 1 of the CIND packet. The weight value GW of this pointer is copied into item 2 of the CIND packet (having first been decoded from the logarithmically encoded form). The address (I) of the CIND packet is then written into the requesting packet, to replace the global pointer.

(11-3) A second new packet location (L) is now obtained from the FPA, and the requested packet is copied into this location from the message. Its reference count is set to one. The address (L) of this new packet is written into item 0 of the CIND packet.

(11-4) The hash-table (FIG. 5) is then accessed, using the global address from item 1 of the CIND packet as the input address to the hash encoder. If the adressed hash table entry is null, the address I of the CIND packet and the global address G are then written into the addressed location of the hash table.

If, on the other hand, the addressed hash table entry is valid, then the reference count of the packet pointed to by the local address in the hash table entry is decremented, and if this reference count is now zero, that packet is garbaged. As before, the address I of the CIND packet and the global address G are then written into the addressed hash table entry.

It can be seen that the CIND packet is pointed to both by the requesting packet and by the hash table entry. This is the reason why the CIND packet is given a reference count equal to 2.

(11-5) It is possible that the requesting packet may be a CIND packet. This can happen when a LIND packet is converted into a CIND as will be described later. In this case, the action is as follows. A new packet address is obtained from the FPA. The contents of the message are copied into this packet, and the reference count set to 1. The address of this new packet is then written into item 0 of the CIND, and the CIND is activated.

The address of the CIND is returned to the parent packet of the CIND.

The hash table is then accessed as described above (11-4).

The result again is a packet structure as shown in FIG. 12.

INSTANCE COPY RETURN

The action in the case of an INSTANCE COPY RETURN is similar to that for a NORMAL COPY RETURN described above.

In this case, however, an IIND packet is created instead of a CIND, or if there is an existing CIND it is converted to an IIND. Also, in this case, no entry is made into the hash table for the IIND packet, and hence the reference count of the IIND packet is set to 1 rather than 2.

This ensures that the packet returned by the INSTANCE COPY RETURN message will be accessible only by the requesting packet, and cannot be shared by any other packets by way of the hash table.

EXPORT FIX UP

Referring now to FIG. 13, this shows the EXPORT FIX UP routine in detail.

As mentioned above, the purpose of this routine is to prepare a packet (either a master version or a copy of it) for exporting to another processing node. In particular, when a packet containing local pointers is copied, then these need to be converted to weighted global pointers.

(13-1) The first action is to test whether the packet to be exported contains any local or remote pointers. (This may be done by testing a flag in the packet header). If not, then no fix-up action is necessary.

(13-2) If the packet does contain a pointer, then the following steps are performed for each argument item in the packet in turn.

(13-3) The ITYPE field of the argument item is tested. If the item is not a pointer, then no further action is taken for this item.

(13-4) If the argument item is a pointer (ITYPE=3), then the pointer qualifier PQUAL of the item is tested, to determine the type of packet pointed to by that item.

(13-5) If the packet pointed to is an indirection packet CIND, IIND and LIND (hereinafter referred to as an IND packet), this means that the item currently being processed must be a local pointer. The first action in this case is therefore to replace this local pointer by the global pointer, held in the IND packet.

(13-6) The REFCNT field of the IND packet is tested.

(13-7) If the REFCNT=1, then the weight of the pointer (i.e. the packet item currently being processed) is set equal to the global weight GW in the IND packet, The global weight in the IND packet is then set to zero. A garbage collection routine is then called, to delete the IND packet and the local copy that it points to.

(13-8) If, on the other hand, REFCNT is greater than one, then the weight of the pointer is set equal to $2^N$ i.e. some power of two. The value $2^N$ is also subtracted from the weight GW in the IND packet. The effect of this is therefore to share the global weight value between the pointer in the packet to be exported, and the IND packet (which remains behind when the packet is exported).

(13-9) If the packet pointed to is a normal packet (i.e. not a CIND, IIND or LIND) then action is as follows. The pointer is tested to determine whether it points to a location in the store of the local processing node, or to a remote location.

(13-10) If the pointer is local, then it does not have any weight value yet, and so it is necessary to create a weight for it, before it is exported. The weight of the pointer is therefore set to $2^N$, i.e. some power of two. The value $2^N$ is also added to the reference count of the packet to which the pointer points.

(3-11) If the parameter SHARED of the EXPORT FIX UP routine is false, then the REFCNT of the packet pointed to is decremented by one, to take account of the fact that one of its local references has now been exported.

(13-12) If the pointer is not local, then the action is as follows. If the parameter SHARED is true, this means that the pointer is being duplicated (i.e. a copy is being created, in addition to the existing master version). The weights of the pointer in the copy and in the master are therefore both set to one half the original weight value, that is, the pointer weight is divided equally between the exported copy and the master.

COPY function (CIND, IIND and LIND)

It will be recalled that, at step (8-3) of the COPY function shown in FIG. 8, the PQUAL field of the packet item is tested, to determine the type of packet pointed to.

Figure 14:
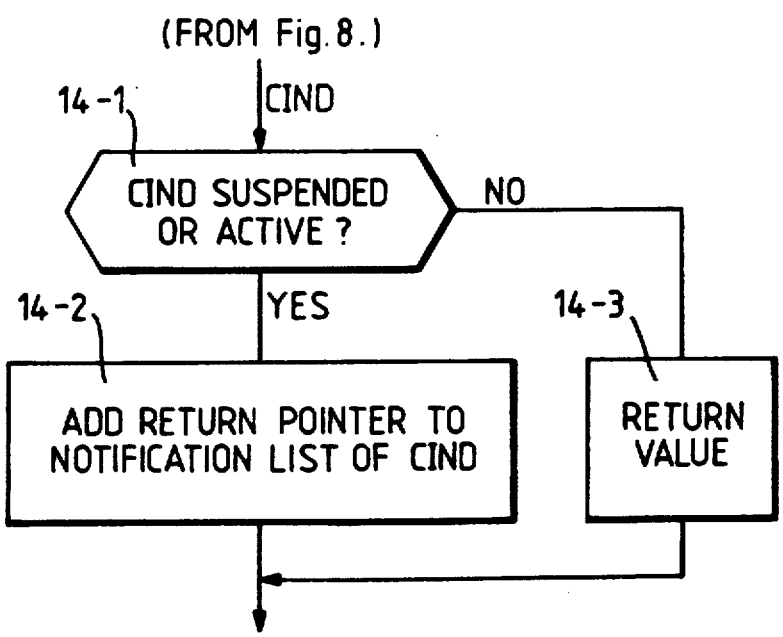
FIGS. 14 to 16 show further parts of the COPY routine of FIG. 8.

For the case where the packet pointed to is a CIND packet, the action is as shown in FIG. 14.

(14-1) A test is made to determine whether the CIND is suspended or active.

(14-2) If it is suspended or active, the address of the packet item currently being processed is added to the notification list of the CIND packet, and the SUSCNT of the packet being processed is incremented by one.

(14-3) If the CIND is not suspended or active, the argument pointed to by the address L in item 0 of the CIND packet is accessed, and returned to the packet item being processed. The evaluated flag EVAL of this item is set.

Figure 15:
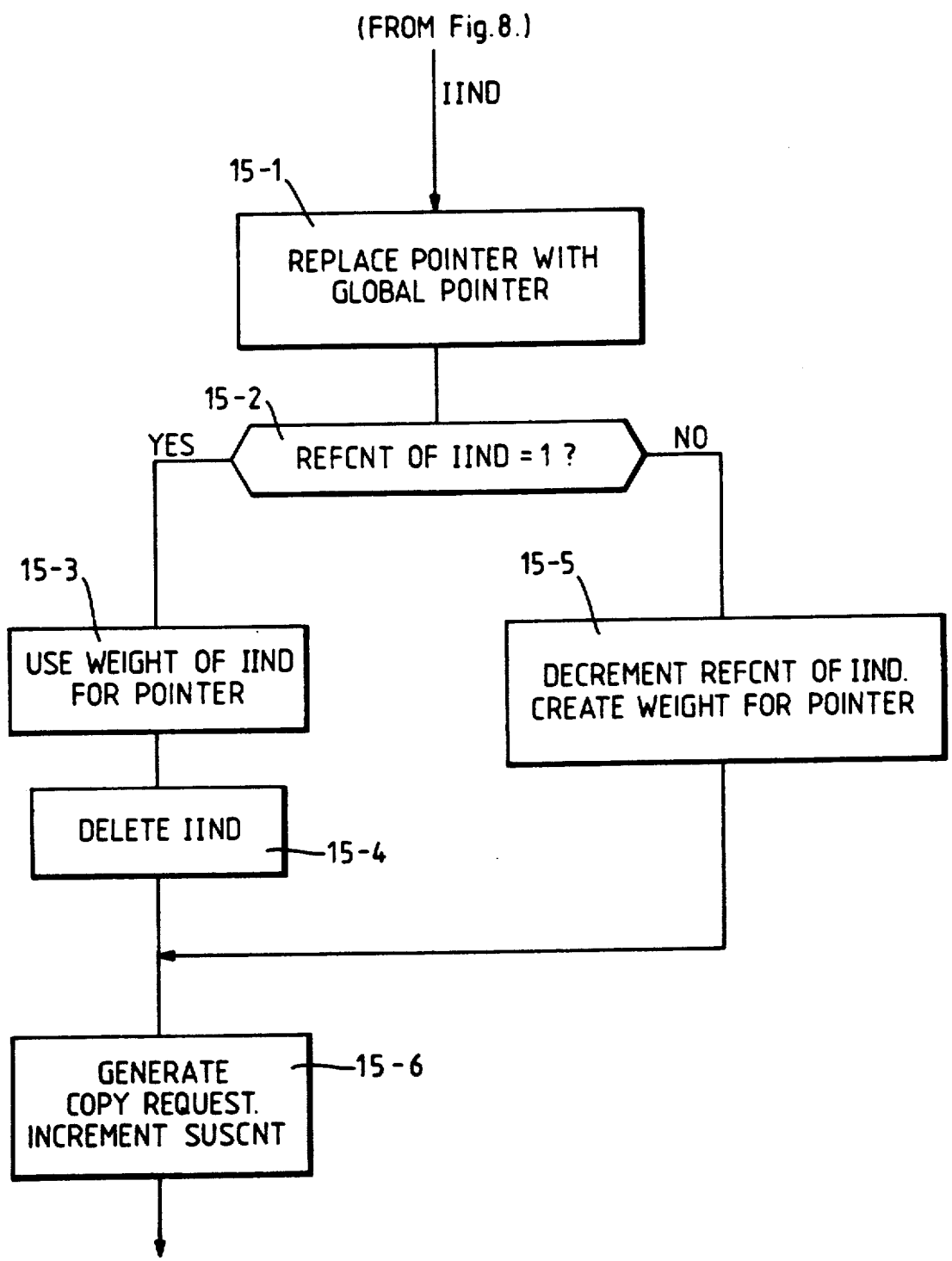

If the packet pointed to is an IIND packet, the action is as shown in FIG. 15.

(15-1) The packet item currently being processed is overwritten with the global address from item 1 of the IIND packet, and the SUSCNT of the packet being processed is incremented by one.

(15-2) The REFCNT of the IIND packet is tested.

(15-3) If the REFCNT is equal to one, then the weight of the packet item currently being processed is set equal to the weight GW in item 2 of the IIND packet. Item 2 of the IIND packet is then reset to zero.

(15-4) A garbage collection operation is then performed in the IIND packet, to return it to the free packet address queue.

(15-5) If, on the other hand, the REFCNT of the IIND packet is not equal to one, then the REFCNT is decremented by one. The weight GW in the IIND packet is decremented by $2^N$, that is by the largest power of two that is less than the current value of GW. At the same time, the weight of the packet item currently being processed is set equal to $2^N$.

(15-6) In either case, a COPY REQUEST message is generated and added to the output message queue, requesting a copy of the packet pointed to by the global address in the packet item currently being processed. The message contains a return address pointing to this packet item. The SUSCNT of the packet being processed is incremented by one.

Thus, it can be seen that the local copy which is pointed to by the IIND packet is not re-used, but rather a COPY REQUEST is made to obtain a fresh copy of the required packet. The reason for this is that the local copy is probably not the most up-to-date copy of the packet in question.

Figure 16:
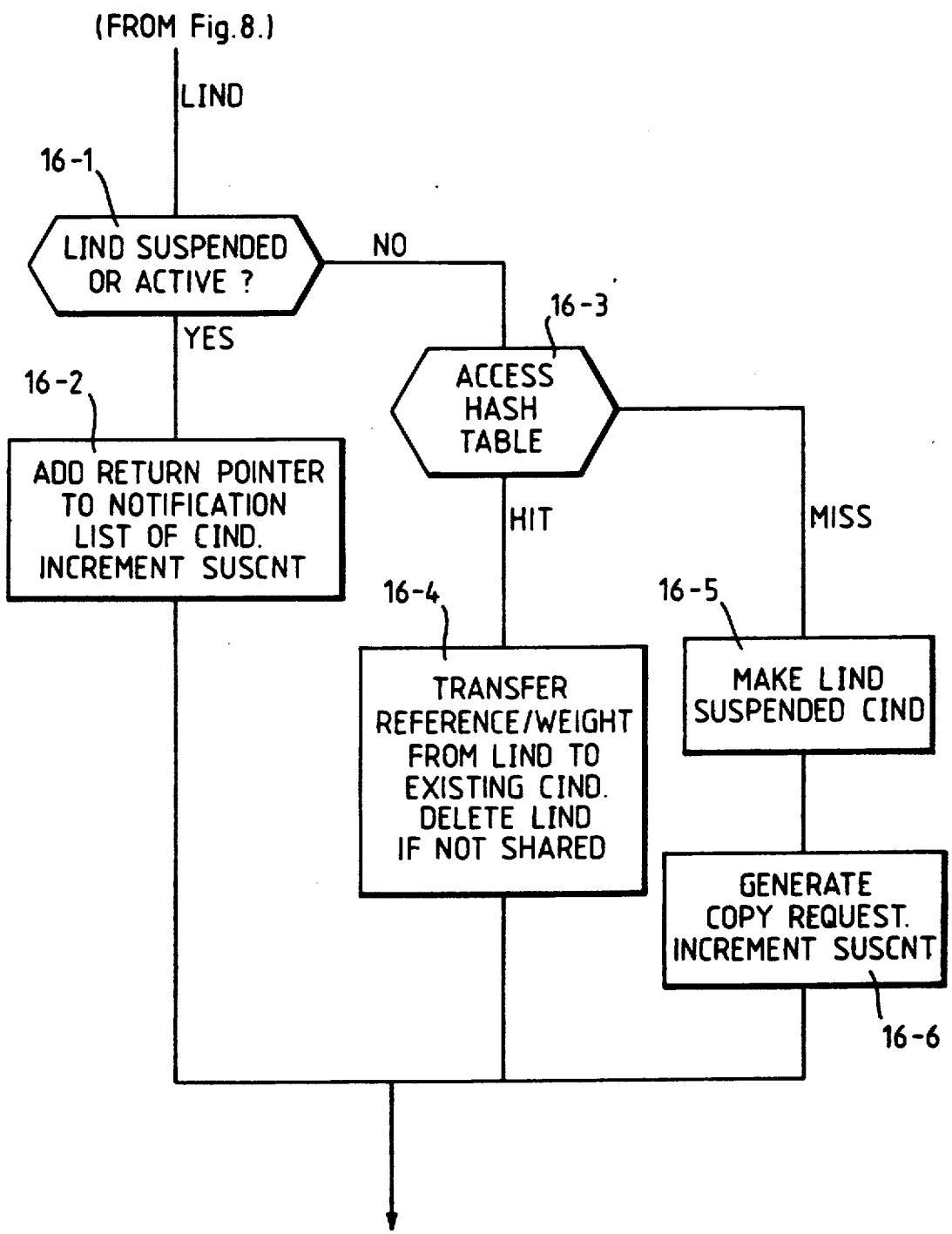

If the packet pointed to is an LIND packet, the action is as shown in FIG. 16.

(16-1) The PSTATE field of the LIND packet is examined.

(16-2) If the LIND packet is suspended or active, then a pointer to the packet currently being processed is added to the notification list of the LIND. The SUSCNT of the packet being processed is incremented by one.

(16-3) If, on the other hand, the LIND packet is not suspended or active, then the hash table (FIG. 5) is accessed, using the pointer in the packet item.

(16-4) If a hit is scored, then this means that a local copy of the required argument packet must already exist, along with a CIND packet pointing to it as shown in FIG. 12. The weight GW of the LIND is therefore add to the weight in the CIND, and the LIND is dereferenced and garbaged if its reference count is now zero.

(16-5) If, a hit is not scored from the hash table, the LIND is converted into a suspended CIND with a pointer back to the packet item currently being processed. The SUSCNT of the packet being processed is incremented by one. A COPY REQUEST message is then generated, requesting a copy of the required packet.

Thus it can be seen that the LIND packet type provides a mechanism allowing an indirection pointer to a packet to be created without the necessity for immediately fetching a local copy of the packet. The local copy is fetched only when it is actually required, in which case the LIND is converted into the normal CIND packet. If the required local copy has already been made by some other packet, and is accessible by way of the hash table, then it is not necessary to make a further copy request.

Conclusion

It can be seen that the CIND packets effectively provide a distributed indirection table which allows local copies of packets to be accessed in an efficient manner. This mechanism can readily handle packets of varying size, and copies can be shared between several parent packets.

It should be noted that, in order to access a local copy of a packet, it is not necessary to use the hash table : the copy is accessed directly by way of the CIND packet. The purpose of the hash table is simply to allow existing local copies to be re-used by different parent packets.

The use of the CIND packets avoids a problem which arises from the use of a simple hash table, in the case where two or more arguments of the same packet hash on to the same location of the hash table. In such a case, it would not be possible for entries relating to both the arguments to be present simultaneously in the hash table, and hence a deadlock situation would arise.

The use of CIND packets also deals with the problem of garbage collection and of maintaining reference counts for packets with multiple copies in different processing nodes.

Also, as described above, the need to copy stateholder packets is avoided by the device of exporting the parent packet of a stateholder to the processing node in which the stateholder resides. This avoids problems of inconsistency which could arise if multiple copies of stateholders were permitted.

In order to achieve this, it is necessary to restrict each packet to a maximum of one stateholder among its strict arguments.

We claim:

1. A multi-processor data processing system comprising a plurality of processing nodes, and a communications network interconnecting the processing nodes, each processing node comprising a data processor and a local store coupled to the data processor, said local store including a packet store holding a plurality of function packets and a plurality of argument packets, each function packet comprising a function field and a pointer field pointing to one of said argument packets, wherein said data processor comprises:

(a) first means coupled to the packet store for accessing a function packet from the packet store and determining from the pointer field of that function packet whether that pointer field points to an argument packet that is resident in a remote node, (b) second means coupled to said packet store and to said communications network and responsive to said first means determining that said pointer field points to an argument packet that is resident in a remote node, for fetching a copy of said argument packet from said remote node into the local store, (c) third means coupled to said packet store and responsive to said second means fetching a copy of said argument packet, for creating in said packet store an indirection packet containing a first pointer to the argument packet in the remote node and a second pointer to the copy of that argument packet in the local store, and (d) fourth means coupled to said packet store for referencing said indirection packet in the packet store to obtain said second pointer and then using said second pointer to access said copy of the argument packet in the local store indirectly.

* * * * *